(12) United States Patent
Dupoy et al.

(10) Patent No.: US 11,592,384 B2
(45) Date of Patent: Feb. 28, 2023

(54) DEVICE AND METHOD FOR DETECTING PARTICLES AND METHOD FOR MANUFACTURING SAME

(71) Applicant: COMMISSARIAT A L'ENERGIE ATOMIQUE ET AUX ENERGIES ALTERNATIVES, Paris (FR)

(72) Inventors: Mathieu Dupoy, Grenoble (FR); Laurent Frey, Grenoble (FR); Serge Gidon, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 227 days.

(21) Appl. No.: 17/247,352

(22) Filed: Dec. 8, 2020

(65) Prior Publication Data
US 2021/0181083 A1   Jun. 17, 2021

(30) Foreign Application Priority Data
Dec. 13, 2019   (FR) ...................................... 1914428

(51) Int. Cl.
*G01N 15/14*   (2006.01)
*G01N 15/00*   (2006.01)

(52) U.S. Cl.
CPC ..... *G01N 15/14* (2013.01); *G01N 2015/0065* (2013.01); *G01N 2015/144* (2013.01);
(Continued)

(58) Field of Classification Search
CPC .......... G01N 15/14; G01N 2015/0065; G01N 2015/144; G01N 2015/1454; G01N 2015/1493
See application file for complete search history.

(56) References Cited

U.S. PATENT DOCUMENTS

| 5,949,532 | A | 9/1999 | Schrof et al. |
| 2019/0120611 | A1* | 4/2019 | Walecki ............. G01B 9/02017 |
| 2020/0025631 | A1* | 1/2020 | Howells ................. G01K 11/00 |

FOREIGN PATENT DOCUMENTS

| WO | 2007/119991 A1 | 10/2007 |
| WO | 2009/057804 A1 | 5/2009 |
| WO | 2011/014282 A2 | 2/2011 |

OTHER PUBLICATIONS

Laukkanen, "Fabrication of metallic micro- and nanostructures for optical solutions", University of Eastern Finland Faculty of Science and Forestry, Department of Physics and Mathematics, 2015.
(Continued)

*Primary Examiner* — Tarifur R Chowdhury
*Assistant Examiner* — Omar H Nixon
(74) *Attorney, Agent, or Firm* — BakerHostetler (57) ABSTRACT

A device for detecting (D) at least one predetermined particle (P) includes an interferometric element (EI) arranged so as to be illuminated by an incident radiation ($L_{in}$) and comprising at least one so-called thin layer (CM) disposed on top of a so-called substrate layer (Sub), the particle being attached to a surface (Sm) of the thin layer, the interferometric element (EI) forming a Fabry-Pérot cavity with or without attached particle P; a matrix sensor (Det) adapted to detect an image comprising a first portion ($P_1$) deriving from the detection of the incident radiation transmitted ($L_{TBG}$) by the interferometric element alone and a second portion ($P_2$) deriving from the detection of the incident radiation transmitted ($L_{TP}$) by the interferometric element and any particle (O, P) attached to a surface (Sm) of the thin layer; a processor (UT) linked to the sensor and configured: to calculate, as a function of wavelengths of the incident radiation $\lambda_i$ $i \in [1,m]$, the variation of intensity of at least one first pixel of the first portion, called first variation ($F_{BG}$) and of at least one second pixel of the second portion, (Continued)

called second variation ($F_P$), to determine a trend, as a function of the wavelengths of the incident radiation $\lambda_i$ $i \in [1,m]$, of a phase shift $\phi_i$ between the first variation and the second variation; to detect the attached particle when the phase shift $\phi_i$ is not constant as a function of the wavelengths of the incident radiation $\lambda_i$ $i \in [1,m]$.

14 Claims, 6 Drawing Sheets (52) U.S. Cl.
CPC ............... *G01N 2015/1454* (2013.01); *G01N 2015/1493* (2013.01)

(56) References Cited

OTHER PUBLICATIONS

Anonymous, "The Correct Material for Infrared (IR) Applications", https://www.edmundoptics.eu/knowledge-center/application-notes/optics/the-correct-material-for-infrared-applications/, 2021.

* cited by examiner

FIG.7

DEVICE AND METHOD FOR DETECTING PARTICLES AND METHOD FOR MANUFACTURING SAME

CROSS-REFERENCE TO RELATED APPLICATIONS

This application claims priority to foreign French patent application No. FR 1914428, filed on Dec. 13, 2019, the disclosure of which is incorporated by reference in its entirety.

FIELD OF THE INVENTION

The present invention relates to the field of particle detection and more particularly the detection of particles by infrared absorption.

BACKGROUND

In many fields of application such as the agri-food industry, defence or chemistry, the detection and identification of particles are necessary to warn of a possible attack or contamination. Many techniques known to the person skilled in the art allow a chemical composition of a sample to be determined.

Fourier transform infrared spectroscopy (FTIR) is an analytical technique that is extremely widely used, in which the molecules of the sample absorb the incident radiation, thus modifying their vibration energies. Based on the bonds and the chemical functions present in the sample, a characteristic infrared spectrum (IR) is obtained.

In addition to FTIR spectroscopy, there are many techniques that allow particles to be identified within a sample, such as Raman spectroscopy, laser induced breakdown spectroscopy (LIBS), or even the photo-fragmentation laser-induced fluorescence (PF-LIF) method, specific to NO2 bonds.

The techniques involving infrared absorption can be declined according to several modalities:

transmission or backscattered IR imaging, by direct absorption of light by the particle. In these methods, optical power collected decreases in the presence of the sample. It is known practice to analyse the gas generated by the breakdown of the sample subjected to a pulsed intense laser with medium infrared (MIR) backscattering. This so-called passive imaging technique allows gas clouds to be detected and identified. It is not possible to use this technique for objects of small dimensions such as particles since the optical path covered in the object is too small.

active thermal imaging, by measuring the temperature rise of the particle subjected to an IR laser flux. The particle absorbs the laser radiation, the collected heat flux increases. This technique is extremely dependent on the substrate where the particle is located. Indeed, the heating induced by the absorption of the laser is transmitted very rapidly to the substrate, which renders detection very complicated.

photoacoustics which can be separated into 4 steps:
(1) absorption of the laser radiation by the gas thus exciting the rotational, electronic and vibrational energy levels;
(2) in the case of ro-vibrational excitations, de-excitation of the gas, preferentially by molecular collisions which will be reflected by a transfer of rotation/vibration energy and kinetic energy creating a localized heating of the gas;
(3) generation of an acoustic wave and of a thermal wave provoked by the expansion due to the heating of the gas;
(4) microphone detection of the acoustic signal. The amplitude of vibration of the microphone is representative of the concentration of the gas and the wavelength of the laser radiation absorbed by the gas indicates its composition. This method is very interesting but it does not allow an image of a zone to be obtained. It will be necessary to scan the laser over the sample which demands instrumentation and measurement time.

These techniques therefore do not allow a spatially and spectrally resolved image to be obtained with a simple and compact device.

SUMMARY OF THE INVENTION

The invention aims to overcome certain problems of the prior art. To this end, a subject of the invention is a device for detecting a predetermined particle having the advantage of having a wide imaging field, of being compact and of requiring the use of an interferometric element that is inexpensive to produce and easily reproducible.

One subject of the invention is a method for detecting at least one predetermined particle, said particles having a refractive index $n_3$ and an absorption line at a resonance wavelength $\lambda_{res}$, said absorption line inducing a variation of the refractive index over a spectral region, said method comprising the following steps:

A. emission of a coherent incident radiation at a plurality of distinct wavelengths $\lambda_i$ $i \in [1,m]$, in succession one by one, said wavelengths lying within one said spectral region;

for each $i \in [1,m]$, the following steps are carried out:

A1: illumination, by the incident radiation at the wavelength $\lambda_i$, of an interferometric element comprising at least two superposed layers, a so-called thin layer, disposed on top of a so-called substrate layer, both transparent to the wavelength $\lambda_i$, said particle being attached to a surface of said thin layer, a refractive index $n_2$ and a thickness $e_2$ of the thin layer being such that the interferometric element forms a Fabry-Pérot cavity with or without attached particle and generates an inversion of the contrast between the Fabry-Pérot-induced fringes without attached particles and the Fabry-Pérot-induced fringes with attached particles;

A2: acquisition, by a matrix sensor, of an image $I_i$ comprising a first portion deriving from the detection of the incident radiation transmitted by the interferometric element alone and a second portion deriving from the detection of the transmitted incident radiation by the interferometric element and any particle attached to the surface of said thin layer, pixels of the first portion exhibiting an intensity that is different from those of the pixels of the second portion;

B. calculation of the variation of intensity, as a function of the wavelengths of the incident radiation $\lambda_i$ $i \in [1,m]$, of at least one first pixel of the first portion, called first variation and of at least one second pixel of the second portion, called second variation;

C. determination of a trend, as a function of the wavelengths of the incident radiation $\lambda_i$ $i \in [1,m]$, of a phase shift $\phi_i$ between the first variation and the second variation;

D. detection of the attached particle when the phase shift $\phi_i$ is not constant as a function of the wavelengths of the incident radiation $\lambda_i$ $i \in [1,m]$.

According to particular embodiments of the invention:

in the step B, an identification of the first pixel and of the second pixel is performed by image processing by comparing the intensity of the pixels of an image Ii associated with a wavelength $\lambda_i$, in the step C, the determination of the trend of the phase shift $\phi_i$ comprises the determination of a function $fn_p$ representing the wavelengths $\lambda_{max,P}$ of the local maxima of the second variation as a function of the wavelengths $\lambda_{max,BG}$ of the local maxima of the first variation;

said distinct wavelengths $\lambda_i$ i∈[1,m] lie between a lower wavelength $\lambda_{inf}$ for which a real part of the refractive index of the particle is minimum over said spectral region, and an upper wavelength $\lambda_{sup}$ for which a real part of the refractive index of the particle is maximum over the spectral region;

the plurality of distinct wavelengths $\lambda_i$ i∈[1,m] comprises a first plurality of wavelengths and a second plurality of wavelengths, said first plurality of wavelengths lying within a spectral interval such as $$\left[\lambda_{inf}; \frac{\lambda_{res} + \lambda_{inf}}{2}\right]$$

and the second plurality of wavelengths lying within a spectral interval such as $$\left[\frac{\lambda_{res} + \lambda_{sup}}{2}; \lambda_{sup}\right];$$

in the step A, the plurality of distinct wavelengths $\lambda_i$ i∈[1,m] is chosen in such a way that the wavelengths are distributed over all of a portion of said spectral region lying between the lower wavelength $\lambda_{inf}$ and the upper wavelength $\lambda_{sup}$;

said interferometric element is adapted so that, for a predetermined thickness $e_{30}$ of particles P attached and passed through by the incident radiation, the contrast of the second variation is nil or substantially nil over a spectral band included in the spectral region.

Another subject of the invention is a device for detecting at least one predetermined particle, said particle having a refractive index $n_3$ and an absorption line at a resonance wavelength $\lambda_{res}$, said absorption line inducing a variation of the refractive index over a spectral region $\Delta\lambda|_{res}$, said device comprising:

a coherent light source (SL), wavelength-tunable and adapted to emit a coherent incident radiation ($L_{in}$) at a plurality of distinct wavelengths i∈[1,m], configured to successively emit said wavelengths, said wavelengths lying within said spectral region;

an interferometric element (EI) arranged so as to be illuminated by the incident radiation ($L_{in}$) and comprising at least one so-called thin layer (CM) disposed on top of a so-called substrate layer (Sub), both transparent in said spectral region, said particle being attached to a surface (Sm) of said thin layer, a refractive index $n_2$ and a thickness $e_2$ of the thin layer being determined from an index $n_1$ of the substrate and from the resonance wavelength $\lambda_{res}$ such that the interferometric element (EI) forms a Fabry-Pérot cavity with or without attached particle P;

a matrix sensor (Det) adapted to detect an image comprising a first portion ($P_1$) deriving from the detection of the incident radiation transmitted ($L_{TBG}$) by the interferometric element alone and a second portion ($P_2$) deriving from the detection of the incident radiation transmitted ($L_{TP}$) by the interferometric element and any particle (O, P) attached to a surface (Sm) of said thin layer, pixels of the first portion exhibiting an intensity that is different from those of the pixels of the second portion;

a processor (UT) linked to the sensor and configured:

to calculate, as a function of the wavelengths of the incident radiation $\lambda_i$ i∈[1,m], the variation of intensity of at least one first pixel of the first portion, called first variation ($F_{BG}$) and of at least one second pixel of the second portion, called second variation ($F_P$), to determine a trend, as a function of the wavelengths of the incident radiation $\lambda_i$ i∈[1,m], of a phase shift $\phi_i$ between the first variation and the second variation;

to detect the attached particle when the phase shift $\phi_i$ is not constant as a function of the wavelengths of the incident radiation $\lambda_i$ i∈[1,m].

According to particular embodiments of the invention:

the thickness $e_2$ of the thin layer lies between $0.8 \times \lambda_{res}/4n_1$ and $1.2 \times \lambda_{res}/4n_1$ with $n_1$ a refractive index of the substrate, and the refractive index $n_2$ of the thin layer is such that $\sqrt{n_1} < n_2 < 1.5\sqrt{n_1}$, preferably such that $1.10\sqrt{n_1} < n_2 < 1.35\sqrt{n_1}$;

a material of the thin layer is identical to the material of the substrate and said surface of the thin layer is structured so that the effective index of the thin layer perceived by the incident radiation is such that $\sqrt{n_1} < n_2 < 1.5\sqrt{n_1}$;

the thickness $e_2$ of the thin layer is adapted so that, for a predetermined thickness $e_{30}$ of particles attached and passed through by the incident radiation, the contrast of the second variation is nil or substantially nil over a spectral band included in the spectral region;

the thin layer is made of ZnS, ZnSe, CdSe, SiN, AlN, Ta2O5, TiO2, ZrO2 and the substrate is made of Si or Ge.

Another subject of the invention is a method for manufacturing an interferometric element for a detection device comprising an interferometric element comprising at least one so-called thin layer disposed on top of a so-called substrate layer, both transparent in a spectral region, said method comprising a phase of design of said interferometric element and a step of physical production of said duly designed interferometric element, characterized in that the design phase comprises the following steps:

selection of at least one particle (P) to be detected having an absorption line at a resonance wavelength $\lambda_{res}$ lying within said spectral region;

selection of a substrate of refractive index $n_1$, determination of a thickness $e_2$ and of a refractive index $n_2$ of the thin layer satisfying the following conditions at the resonance wavelength:

the interferometric element (EI) forms a Fabry-Pérot cavity with or without attached particle P and generates an inversion of the contrast between the Fabry-Pérot-induced fringes without attached particles and the Fabry-Pérot-induced fringes with attached particles, and $$0.8 \times \frac{\lambda_{res}}{4n_1} < e_2 < 1.2 \times \frac{\lambda_{res}}{4n_1} \text{ and } \sqrt{n_1} < n_2 < 1.5\sqrt{n_1}.$$

According to a particular embodiment of the invention, said resonant wavelength $\lambda_{res}$ lies between 3 μm and 12 μm, and the particle or particles to be detected are explosive particles, biomolecules.

BRIEF DESCRIPTION OF THE DRAWINGS

Other features, details and advantages of the invention will emerge on reading the description given with reference to the attached drawings that are given by way of example and which represent, respectively.

In the figures, unless indicated otherwise, the elements are not to scale.

DETAILED DESCRIPTION

Figure 1:
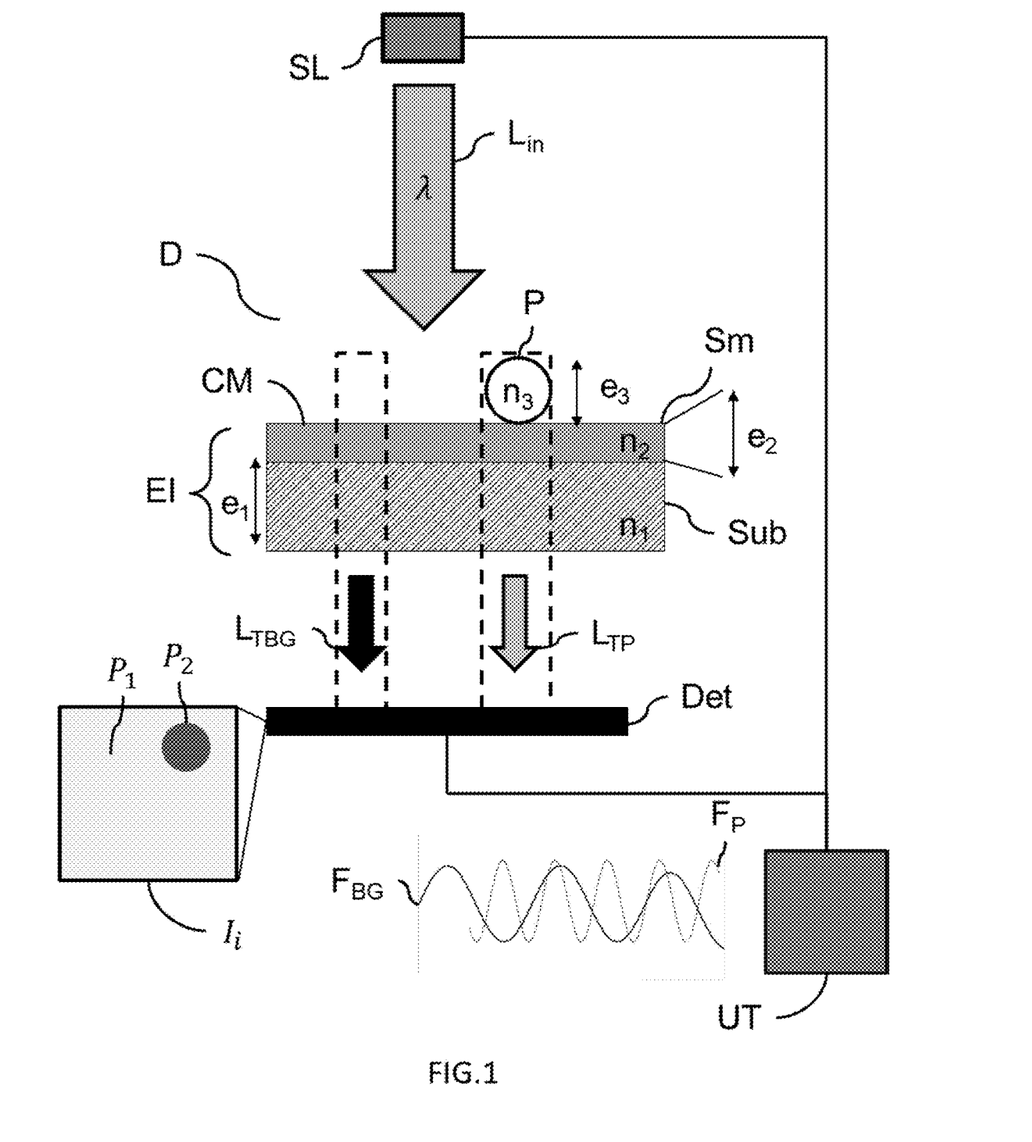
FIG. 1 a schematic view of a detection device according to the invention.

FIG. 1 illustrates a schematic view of a device D for detecting at least one predetermined particle P.

The particle P is the particle that the device D aims to detect. This particle is known and predetermined in a phase of design of the device (see later). This particle P has a refractive index $n_3$ and an absorption line (or peak) with a resonance wavelength $\lambda_{res}$.

Figure 2:
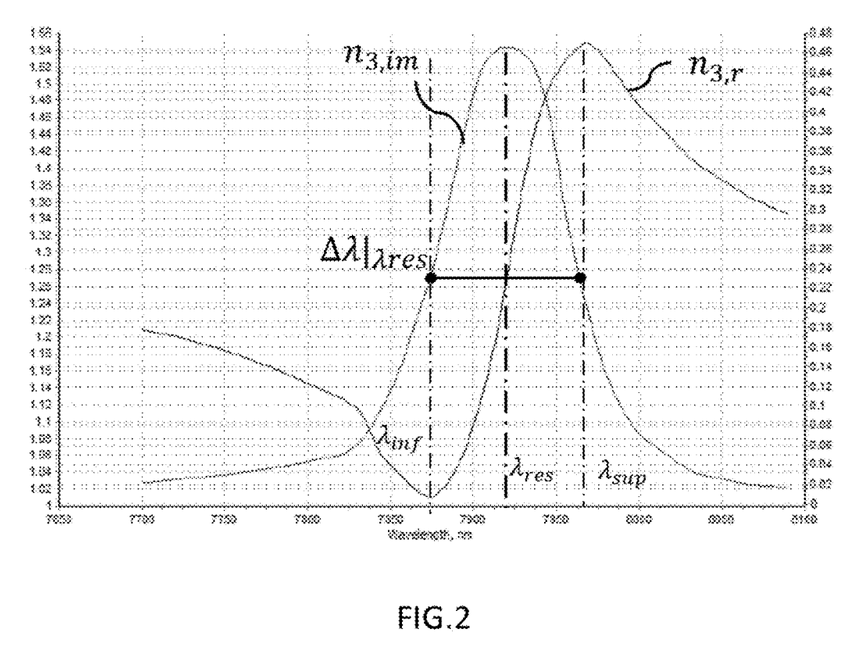
FIG. 2 the imaginary and real part of the refractive index of an example of predetermined particle.

The Kramers-Kronig relationships link, as is known, the imaginary part $n_{3,im}$ and the real part of the refractive index $n_{3,r}$. This relationship induces, upon the resonant absorption at the resonance wavelength $\lambda_{res}$, an abrupt variation of the real part of the refractive index $n_{3,r}$. According to the invention, the variation of the refractive index of the particle allows the phase-changes induced at the absorption length to be measured using an optical cavity. FIG. 2 is a graph representing the imaginary part and the real part of the refractive index of an example given as a nonlimiting example of predetermined particle, PDMS, having a resonance wavelength $\lambda_{res}$=7.9 μm.

The device D of FIG. 1 comprises a wavelength-tunable coherent light source SL. This source is adapted to emit a coherent incident radiation $L_{in}$, at a plurality of distinct wavelengths $\lambda_i$ i∈[1,m], lying within a spectral region of variation of the refractive index $\Delta\lambda|_{\lambda_{res}}$ associated with said absorption line. The light source is configured to emit the wavelengths successively, that is to say one by one over time. This spectral region $\Delta\lambda|_{\lambda_{res}}$ is, for example, centred on the resonance wavelength $\lambda_{res}$ and of a width equal to the width at mid height $FWHM_{\lambda_{res}}$ of the absorption peak at the wavelength $\lambda_{res}$, as in the example of FIG. 2. Alternatively, this spectral region $\Delta\lambda|_{\lambda_{res}}$ is centred on the resonance wavelength $\lambda_{res}$ and of a width equal to 1.5×$FWHM_{\lambda_{res}}$ of the absorption peak at the wavelength $\lambda_{res}$.

According to a preferred embodiment of the invention, the light source SL comprises an optical collimation system, adapted so that the incident radiation emitted by the light source is collimated. This optical collimation system can, for example, be a lens whose object focal plane includes the source points of the incident radiation.

An interferometric element EI of the device D is arranged so as to be illuminated by the incident radiation $L_{in}$. This interferometric element comprises at least two superposed layers, a so-called thin layer CM disposed on top of a so-called substrate layer Sub, both transparent in the spectral region of variation of the refractive index $\Delta\lambda|_{\lambda_{res}}$ associated with said absorption line. Transparent is understood to mean here that each layer has a transmission greater than 50%, preferentially 90%, in the spectral region.

The interferometric element EI is configured so as to be an optical cavity of Fabry-Pérot type forming wavelength fringes in transmission. The principle of the invention is to detect a phase shift between the Fabry-Pérot-induced fringes without attached particles and Fabry-Pérot-induced fringes with attached particles. Indeed, the presence of particles attached to the surface Sm of the thin layer locally modifies the reflection coefficient of the surface to which they are attached, which leads to a phase-shifting of the reflection coefficient (see later).

The inventors have shown that a Fabry-Pérot formed by a single layer does not allow a phase shift to be observed. Thus, the element EI is configured so that the phase shift of the curve of transmission as a function of wavelength of a stack formed by at least one particle attached to the interferometric element on the one hand, and the interferometric element alone on the other hand, is not constant within the spectral region.

After numerous simulations, the inventors have determined that the thin layer needs to have a refractive index $n_2$ that is substantially offset from the value which would make the thin layer CM an antireflection layer with respect to air at the illumination wavelength $\lambda_{res}$, that is to say $n_{2,r}=\sqrt{n_1}$ (together with a thickness $e_{2,r}=\lambda_{res}/4n_1$). That allows wavelength fringes in transmission induced by the Fabry-Pérot cavity to be obtained when no particle P is attached. Indeed, if the thin layer were an antireflection layer, there would be no Fabry-Pérot interferometer. The inventors have also determined that it was essential not to deviate far from these antireflection conditions because, in a band of index $n_2$ (and with $n_2>n_{2,r}$), an inversion of the contrast of the Fabry-Pérot-induced fringes without attached particles and of the Fabry-Pérot-induced fringes with attached particles is observed when the wavelength of the incident radiation scans resonance (see FIG. 3 and attached passage). This fringe inversion is a signature of the presence of the particle attached to the thin layer and allows for an identification thereof. If there is too much of a deviation from this condition on the index $n_2$ ($n_2$ too close to $n_{2r}$, $n_2 < n_{2r}$, or $n_2$ too great, for example $n_2 > 2.5 \cdot n_{2r}$), the zone of contrast inversion moves away from the resonance wavelength, even disappears (there is then no longer contrast inversion).

This feature is reflected by two conditions on the characteristics $e_2$ and $n_2$ of the thin layer CM. More specifically, a refractive index $n_2$ and a thickness $e_2$ of the thin layer being determined from an index $n_1$ of the substrate and from the resonance wavelength $\lambda_{res}$ such that the interferometric element (EI) forms a Fabry-Pérot cavity with or without attached particle P; and generates an inversion of the contrast of the Fabry-Pérot-induced fringes without attached particles and of the Fabry-Pérot-induced fringes with attached particles, in the spectral region of variation of the refractive index $\Delta\lambda|_{\lambda res}$.

According to the invention, $e_2$ and $n_2$ satisfy the condition:

$$0.8 \times \lambda_{res}/4n_1 < e_2 < 1.2 \times \lambda_{res}/4n_1$$

$\sqrt{n_1} < n_2 < 1.5 \sqrt{n_1}$, preferably such that $1.10 \sqrt{n_1} \times < n_2 < 1.35 \sqrt{n_1}$.

Hereinbelow, it is assumed that at least one particle P is attached to a surface Sm of said thin layer CM.

The device D according to the invention, uses the principle of IR absorption of the particles P which will locally modify the reflection coefficient of the surface Sm where they are attached. Indeed, the reflection coefficient of the surface Sm at the resonance wavelength of the sample $\lambda_{res}$ will be modified upon presence of the particles thus modifying the flux of the incident radiation reflected or transmitted. The reflection coefficient $R_p$ for the interface between the surface Sm of the thin layer and a particle P attached to this surface is defined by:

$$R_p = \left(\frac{n_3 - n_2}{n_3 + n_2}\right)^2$$

Likewise, the reflection coefficient $R_{bg}$ for the interface between the surface Sm of the thin layer and air of index $n_{air}$ when no particle is attached to this zone of the surface Sm is defined by $$R_{bg} = \left(\frac{n_{air} - n_2}{n_{air} + n_2}\right)^2.$$

Thus, upon a variation of the wavelength of the incident radiation around the spectral region, the real part $n_{3,r}$ of the refractive index $n_3$ (and therefore the reflection coefficient $R_p$) varies significantly.

As is known, the transmission of the incident radiation by the interferometric element is modelled by the Abeles matrix formalism. This thin-layer formalism is suitable because the particles P to be detected are generally surrounded by a liquid film (water, sweat, sebum). For a hydrophile surface Sm, these particles will have a tendency to spread to form a film of fine thickness $e_3$. The use of this formalism assumes that a dimension in a longitudinal direction of attached particles P is greater by at least a factor of 10 than the thickness $e_3$ of attached particles P.

Figure 3:
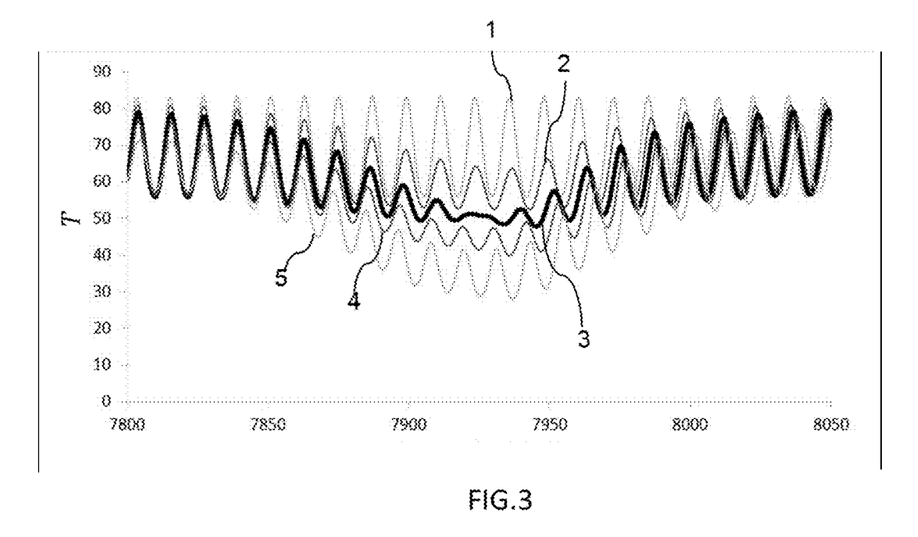
FIG. 3 the transmission of an interferometric element of the detection device according to the invention, as a function of the wavelength of the incident radiation, for a plurality of thicknesses of particles to be detected attached to a surface of the interferometric element.

FIG. 3 represents the transmission of the interferometric element of the detection device of FIG. 1 alone, as a function of the wavelength of the incident radiation (curve 1). FIG. 3 also represents the transmission, as a function of the wavelength of the incident radiation, of the stack formed by, respectively, a thickness of 250 nm (curve 2), of 500 nm (curve 3), of 750 nm (curve 4) and of 1000 nm (curve 5) of attached particles of PDMS and the interferometric element EI. The oscillations of the transmission as a function of the wavelength are due to constructive-to-destructive interference transitions (or the reverse) produced by the rays of the incident radiation reflected or transmitted by the different interfaces of the interferometric element upon a change of wavelength.

FIG. 3 directly shows the effect of the absorption of different thicknesses of attached particles P, greatly reducing the transmission of the curves 2 to 5 with respect to the curve 1. This absorption is due to the imaginary part $n_{3,im}$ of the refractive index of the particle P linked to the absorption coefficient $\alpha$ of the particles at the wavelength $\lambda$, by the following equation $\alpha = 4\pi n_{3,im}/\lambda$.

For one and the same curve out of the curves 2 to 5, the variation of the mean value of the transmission is due to the variation of the imaginary part $n_{3,im}$ of the refractive index of the particle P over the spectral region $\Delta\lambda|_{\lambda res}$. Critically, FIG. 3 shows a trend, as a function of the wavelength, of the phase shift between the curves 2 to 5 and the curve 1. This trend of the phase shift is due to the variation of the real part of the refractive index $n_3$ over the spectral region $\Delta\lambda|_{\lambda res}$ and it is that which will allow the presence of particles P attached to the surface Sm to be identified.

In all the embodiments of the invention, the thickness $e_2$ of the thin layer is configured for there to be a predetermined thickness $e_{30}$ of particles attached and passed through by the incident radiation, such that the contrast of the oscillations of the transmission as a function of the wavelength of such a stack is nil or substantially nil over a spectral band included in the spectral region $\Delta\lambda|_{\lambda res}$. Substantially nil is understood to mean a contrast of less than 10%. This condition allows the identification, by the device D, of a particular and predetermined thickness $e_{30}$ of attached particles P for example allowing a concentration in a given ambient medium to be restored. In FIG. 3, this thickness $e_{30}$ corresponds to the thickness for which the curve 3 is obtained. For an attached particle thickness greater than $e_{30}$, an inversion of the contrast of the Fabry-Pérot-induced fringes without attached particles (curve 1) and of the Fabry-Pérot-induced fringes with attached particles (curves 4 and 5) is observed in the spectral region of variation of the refractive index $\Delta\lambda|_{\lambda res}$.

In the example of FIG. 3, given as a nonlimiting example, the substrate is made of silicon, with a thickness $e_1 = 750$ μm and has a refractive index $n_1 = 3.42$ at $\lambda_{res} = 7.9$ μm. Furthermore, the thin layer is made of ZnS, with a thickness $e_2 = 889$ nm and has a refractive index $n_2 = 2.2$ at $\Delta_{res} = 7.9$ μm. In light of this example and the rest of the description, the person skilled in the art will easily adapt the different parameters of the interferometric element in order to detect another predetermined particle P.

The device D of FIG. 1 further comprises a matrix sensor or detector Det. This detector is adapted to detect an image comprising a first portion $P_1$ deriving from the detection of the incident radiation transmitted $L_{TBG}$ by the interferometric element alone and a second portion $P_2$ deriving from the detection of the incident radiation transmitted $L_{TP}$ by the interferometric element and any particle (this particle being able to be a particle to be detected P or any other object O) attached to the surface Sm of said thin layer. The identification of the first portion and of the second portion is based on the fact that the pixels of the first portion exhibit an intensity that is different from those of the pixels of the second portion. For each wavelength $\lambda_i$ of the incident radiation, the detector detects an associated image $I_i$. For that, the device of FIG. 1 comprises a processor UT linked to the detector and to the light source SL in order to synchronize these two elements.

The intensity of the pixels of each image $I_i$ (or ADU value, ADU standing for analog to digital unit) is proportional to the number of photons detected by this pixel. For a collimated beam or one situated in the image plane of the sample, the intensity of the pixels of the image is therefore representative of the transmission of the optical path of the incident radiation between the light source SL and the detector Det. Also, for each i∈[1,m], the first portion $P_1$ of the image $I_i$ represents the transmission at the wavelength $\lambda_i$ of the interferometric element alone, and the second portion of the image $I_i$ represents the transmission of the wavelength $\lambda_i$ of the stack formed by at least any one particle and the interferometric element. The curve 1 of FIG. 3 corresponds to the first variation of intensity and the curves 2 to 5 of FIG. 3 correspond to the second variation of intensity, when the any attached particle is a predetermined particle P.

According to one embodiment of the invention, the detector is placed as close as possible to the interferometric element and at least in the Fresnel diffraction (or near field) zone after the interferometric element in order for the image to be representative of the transmission and not of the far field diffraction of the transmission (therefore its Fourier transform).

The processor UT is configured to calculate, as a function of the wavelengths of the incident radiation $\lambda_i$ i∈[1,m], the variation of intensity of at least one first pixel of the first portion, called first variation $F_{BG}$ and of at least one second pixel of the second portion, called second variation $F_P$. The first variation corresponds to the transmission, as a function of wavelengths of the incident radiation $\lambda_i$ i∈[1,m], of the interferometric element alone. The second variation corresponds to the transmission, as a function of the wavelengths of the incident radiation i∈[1,m], of the stack formed by at least one attached particle and the interferometric element.

The processor UT is configured to determine a trend, as a function of the wavelengths of the incident radiation $\lambda_i$ i∈[1,m], of a phase shift $\phi_i$ between the first variation and the second variation. Finally, the processor is configured to detect the attached particle when the phase shift $\phi_i$ is not constant as a function of the wavelengths of the incident radiation $\lambda_i$ i∈[1,m].

Figure 4A:
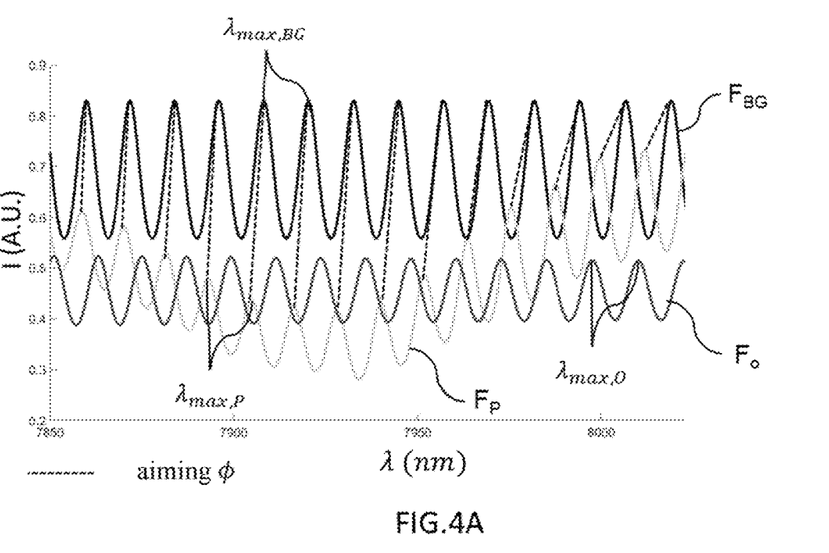
FIG. 4A and FIG. 4B, respectively, the transmission of an interferometric element of the detection device according to the invention, as a function of the wavelength of the incident radiation, in different conditions, and a graph representing the trend, as a function of the wavelength of the incident radiation, of the phase shift between two interference fringes obtained by the incident radiation passing through a different portion of the interferometric element.

FIG. 4A illustrates the first variation $F_{BG}$ and the second variation $F_P$ obtained for the example of FIG. 3, for a thickness of PDMS particles of 1000 nm. The abscissa of these variations is the wavelength of the incident radiation and the ordinate is the intensity of the first pixel and of the second pixel, respectively. The dotted lines of FIG. 4A point to the local maxima $\lambda_{max,BG}$ and $\lambda_{max,P}$ of the first variation and of the second variation, respectively, and allow the trend of the phase shift $\phi_i$ between the first variation $F_{BG}$ and the second variation $F_P$ to be displayed, as a function of the wavelength $\lambda_i$ of the incident radiation.

According to one embodiment of the invention, the identification by the processor of the first pixel and of the second pixel is performed by image processing by comparing the intensity of the pixels of one of the images $I_i$ i∈[1,m], associated with a wavelength $\lambda_i$. Indeed, as mentioned previously, the transmission of the interferometric element alone is less than the transmission of the stack formed by at least one attached particle P and the interferometric element, over the spectral region of variation of the refractive index $\Delta\lambda|_{\lambda_{res}}$ (see FIG. 3). Also, the ADU value of the pixels associated with the second portion LIP is lower than that of the pixels associated with the first portion $L_{TBG}$. It is important to note that when no particle P, nor any other object, is attached to the surface Sm of the interferometric element, there is no significant transmission difference between the different rays of the incident radiation. Also, the ADU value of the pixels of the sensor is substantially the same and, by comparing the value of the pixels by image processing, it is possible to determine that no particle is attached to the interferometric element.

According to a preferred embodiment of the invention, the plurality of distinct wavelengths $\lambda_i$, i★[1, n] of the incident radiation are emitted successively so that the wavelengths lie between a lower wavelength $\lambda_{inf}$ and an upper wavelength $\lambda_{sup}$, in which $\lambda_{inf}$ (respectively $\lambda_{sup}$) is the wavelength for which the real part of the refractive index of the particle is minimum (respectively maximum) over the region of variation. This condition allows the greatest possible phase shift of the reflection coefficient $R_P$ and therefore the greatest phase shift $\phi_i$ between the first variation and the second variation, to be observed.

Figure 5:
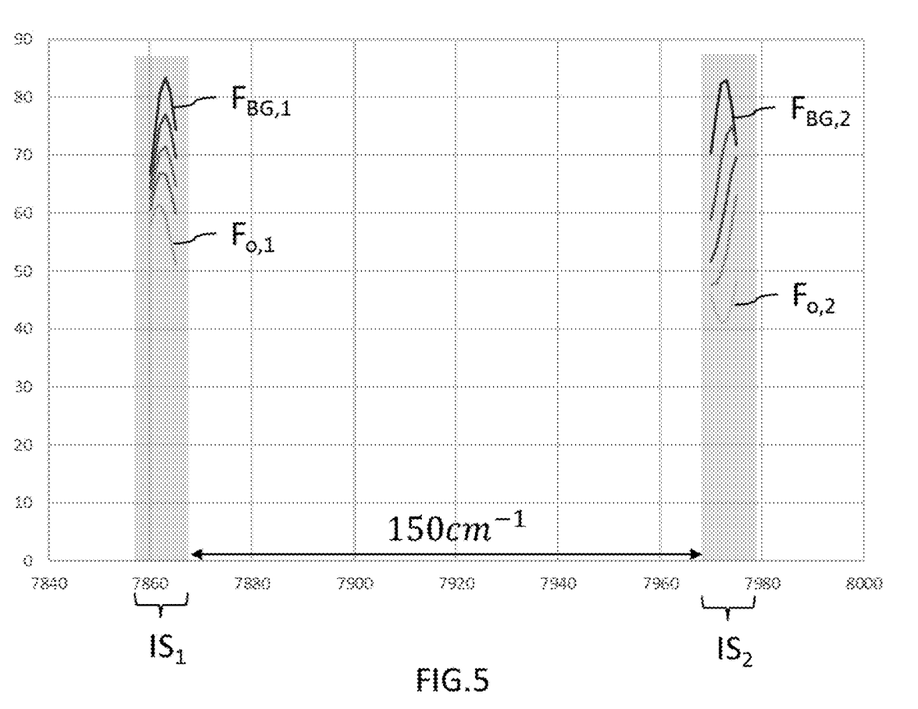
FIG. 5 a representation of the spectral intervals allowing determination of a phase shift according to an embodiment of the invention.

According to a first variant of this preferred embodiment of the invention, illustrated in FIG. 5, the plurality of distinct wavelengths $\lambda_i$, i∈[1,n], comprises a first plurality of wavelengths and a second plurality of wavelengths. The first plurality of wavelengths lies within a spectral interval $IS_1$ such as $$\left[\lambda_{inf}; \frac{\lambda_{res} + \lambda_{inf}}{2}\right]$$

and the second plurality of wavelengths lies within a spectral interval $IS_2$ such as $$\left[\frac{\lambda_{res} + \lambda_{sup}}{2}; \lambda_{sup}\right].$$

In this first variant, the processor is therefore configured to calculate a first part of the first variation and of the second variation, respectively $F_{BG,1}$ and $F_{o,1}$, associated with the first plurality of wavelengths. Furthermore, the processor is configured to calculate a second part of the first variation and of the second variation, respectively $F_{BG,2}$ and $F_{o,2}$, associated with the second plurality of wavelengths. In this embodiment, the first plurality of wavelengths has to allow the determination of at least one period of the oscillations of the first part of the first variation and of the second variation in order to allow the determination of a phase shift between the first variation and the second variation. Furthermore, the second plurality of wavelengths needs to allow the determination of at least one period of the oscillations of the second part of the first variation and of the second variation. These conditions are necessary in order to be able to determine a trend of the phase shift as a function of the wavelength. The lower wavelength and the upper wavelength are situated on either side of the resonance wavelength and correspond to a maximum variation of the real part of the refractive index $n_3$. That allows a significant variation of the phase shift to be obtained between the first part of the first variation and of the second variation on the one hand, and the second part of the first variation and of the second variation on the other hand. The detection of the particle P is then facilitated. Furthermore, this embodiment allows the wavelength of the incident radiation to be varied only around two distinct spectral zones, less extensive than the spectral region $\Delta\lambda|_{\lambda_{res}}$. Also, it allows the determination of a trend of the phase shift that is faster than a scan of all of the spectral region. In this embodiment, the wavelengths of the first plurality and of the second plurality cover at least 3 cm$^{-1}$ to 5 cm$^{-1}$ and are separated by approximately 100 cm$^{-1}$ to 150 cm$^{-1}$ in order to be able to calculate the first variation and the second variation. The first wavelength band corresponds to the tunability range of a discrete QCL laser and the second corresponds to the range of the gain of the quantum well of the layer stack of the QCL laser.

According to a second variant of this preferred embodiment of the invention, the plurality of wavelengths is chosen so that wavelengths sample all of a spectral region lying between the lower wavelength $\lambda_{inf}$ and the upper wavelength $\lambda_{sup}$. Thus, for wavelengths that are sufficiently close to one another (for example separated by approximately 100 to 150 cm$^{-1}$), it is possible to accurately calculate the first variation and the second variation then determine the trend of the phase shift in the simplest possible manner, that is to say by scanning all of the spectral region using the incident radiation.

Figure 4B:
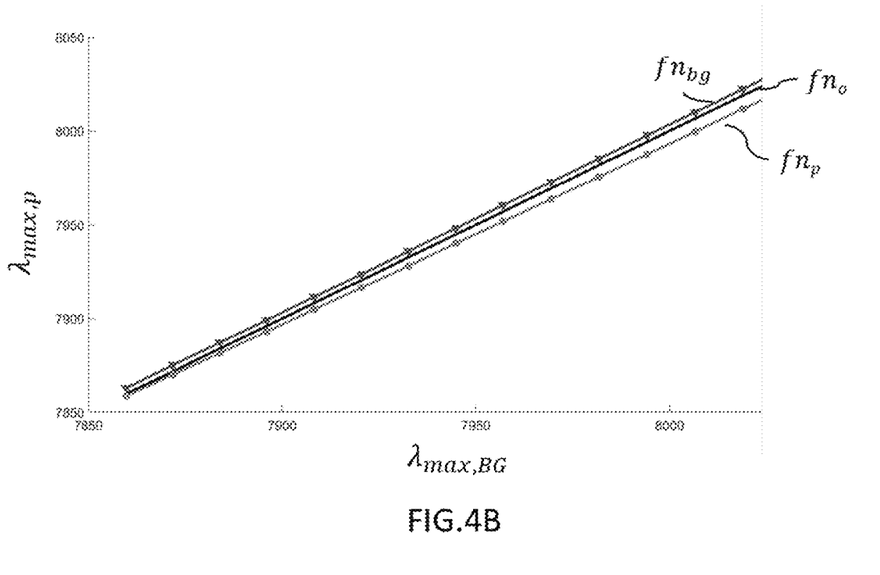

According to one embodiment, the determination, by the processor UT, of a trend of the phase shift $\phi_i$ as a function of the wavelengths of the incident radiation comprises the determination of a function $fn_p$ representing the wavelengths $\lambda_{max,P}$ of the local maxima of the second variation as a function of the wavelengths $\lambda_{max,BG}$ of the local maxima of the first variation, over the spectral region $\Delta\lambda|_{\lambda_{res}}$. The determination of the function $fn_p$ is performed by interpolation from at least two wavelengths $\lambda_{max,p}$ of the local maxima of the second variation, each associated with a wavelength $\lambda_{max,BG}$ of the first variation. FIG. 4B illustrates the representation of the function $fn_p$. When the slope of the function $fn_p$ is different from the value 1, the processor is configured to confirm the presence of an attached particle P. Indeed, that means that the phase shift between the first variation and the second variation is not constant over the spectral band. More specifically, that implies that a particle P exhibiting a variation of the real part of its refractive index over the spectral band is attached to the interferometric element. In FIG. 4B, the function $fn_{bg}$ represents the equation y=x determined from the wavelengths $\lambda_{max,BG}$ of the local maxima of the first variation. Thus function is simply represented for comparison with the slope of the function $fn_p$.

The device D has the advantage of being a "lenseless" imaging device which is therefore easy to align and to use and which allows a rapid detection of predetermined particles P.

Figure 6:
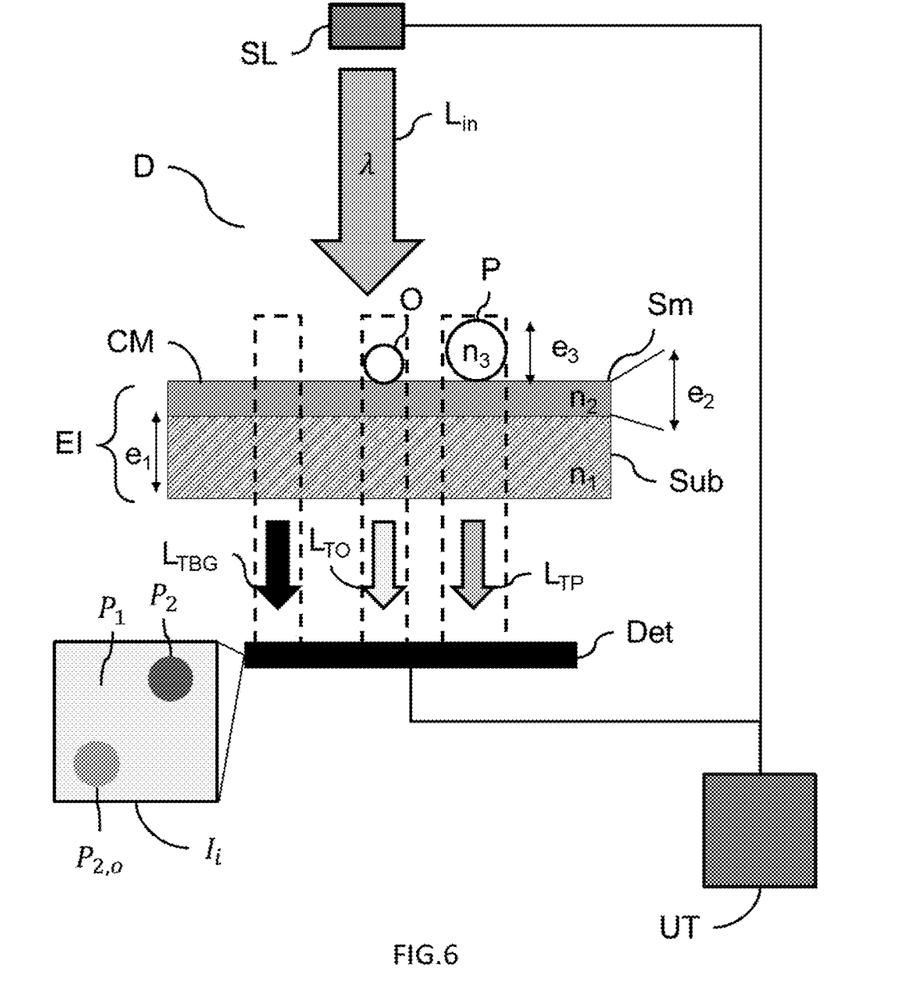
FIG. 6 a schematic view of a detection device according to the invention.

Another advantage of the device D of FIG. 1 is that it allows the non-resonant absorption of an object O, that is to say an object which absorbs over the spectral region but which does not have an absorption line at or in the vicinity of $\lambda_{res}$, such as water for example (see FIG. 6) to be dispensed with. That means that the presence of such an object O attached to a surface Sm of the thin layer CM will not lead to the erroneous detection of a particle P to be detected by the processor UT. To illustrate this advantage, FIG. 4A also presents a second variation $F_o$ of the intensity of a second pixel of a second portion $P_{2,o}$ of the image $I_i$ deriving from the detection of the incident radiation of wavelength $\lambda_i$ transmitted $L_{TO}$ by the stack formed by the object O attached to the surface Sm of the interferometric element, and the interferometric element (see FIG. 6). This second variation $F_o$ is determined by the processor in the same way as specified previously. The processor then determines the function $fn_o$ representing the wavelengths $\lambda_{max,0}$ of the local maxima of the second variation as a function of the wavelengths $\lambda_{max,BG}$ of the local maxima of the first variation, over the spectrial region $\Delta\lambda|_{\lambda_{res}}$ (see FIG. 4B). Although the object O absorbs at the wavelengths this absorption is not resonant which means that a phase shift between the first variation and the second variation $F_o$ is constant as a function of the wavelength of the incident radiation. Thus, the slope of the function $fn_0$ is equal to 1 and the processor does not associate the object O with a particle P to be detected.

According to one embodiment, the light source is a tunable laser source emitting over a spectral range lying between 3 µm and 12 µm and the resonance wavelength $\lambda_{res}$ of the predetermined particle to be detected P lies within this spectral range. According to a preferred embodiment of the invention, this source is a quantum cascade laser (QCL). QCLs have the advantage of being compact and of offering a very good wavelength tunability. Alternatively, the source is an optical parametric oscillator (OPO).

According to one embodiment of the invention, the thin layer is made of ZnS, of ZnSe, CdSe, SiN, AlN, $Ta_2O_5$, $TiO_2$, $ZrO_2$, amorphous carbon, chalcogenide and the substrate is made of Si or of Ge.

Alternatively, according to another embodiment of the invention, the material of the thin layer is identical to the material of the substrate and the surface of the thin layer is structured so that the effective index of the thin layer perceived by the incident radiation is adapted as specified previously. "Structured" is understood here to mean that the layer has a pattern that is repeated in a longitudinal direction of the thin layer, with a half-period less than the plurality of distinct wavelengths $\lambda_i$ i∈[1,m] of the incident radiation. The structuring of the thin layer can be produced with all of the techniques known to the person skilled in the art, such as electron beam lithography or EUV lithography.

According to one embodiment, the diameter of the incident radiation upon the illumination of the interferometric element is greater than or equal to the dimension of the detector Det, that is to say greater than or equal to 1 cm and a longitudinal dimension of the interferometric element is greater than or equal to the dimension of the detector Det. Thus, it is possible to perform the detection of particles P in wide field mode.

According to one embodiment, the matrix sensor of the invention is a bolometer matrix, an infrared photodetector of mercury-cadmium-telluride (MCT) type, a hybridized imager (combining the MCT and QWIP technologies) or even a pyrometer matrix.

Figure 7:
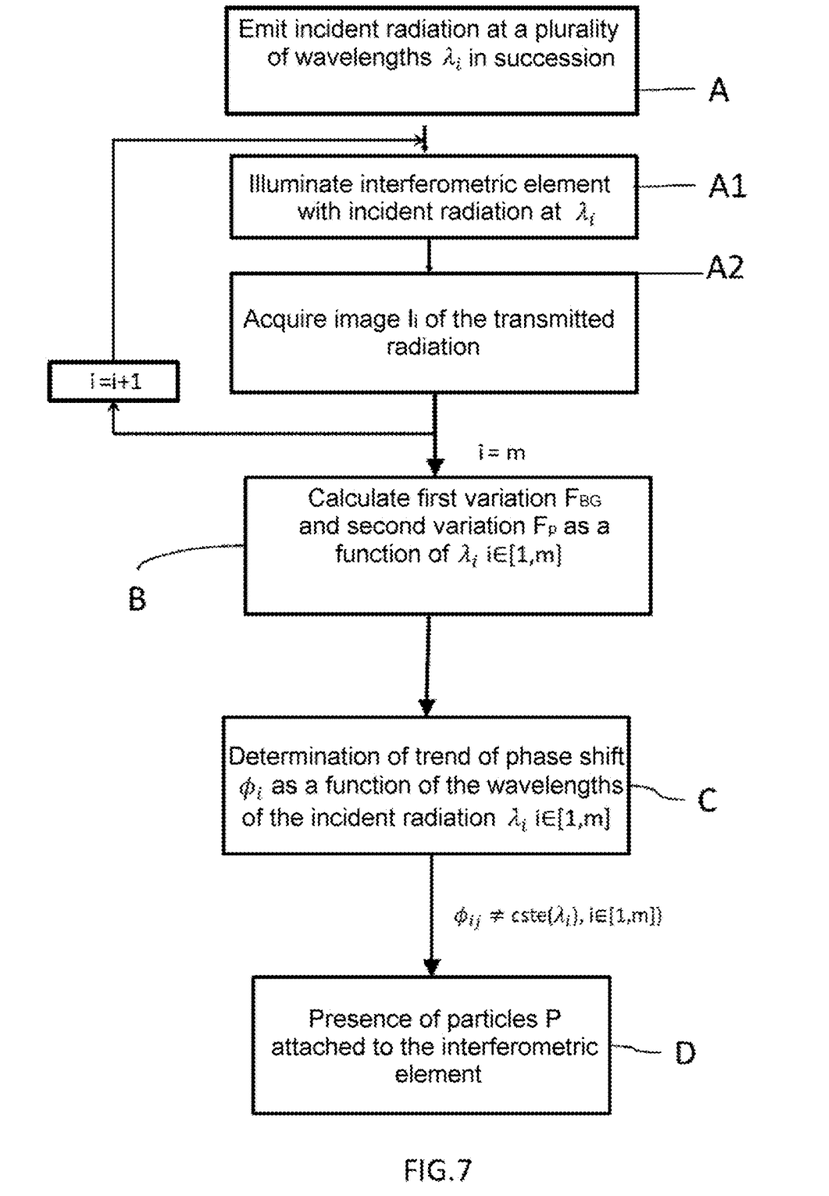
FIG. 7 a schematic representation of a method for detecting particles according to the invention.

Another subject of the invention is a method for detecting at least one predetermined particle implemented by the detection device D of FIG. 1. This method is schematically represented in FIG. 7 and comprises the following steps:

emission of the coherent incident radiation $L_{in}$ at a plurality of distinct wavelengths $\lambda_i$ i∈[1,m], in succession one by one, said wavelengths lying within a region of variation of the refractive index $\Delta\lambda|_{\lambda_{res}}$ associated with said absorption line;

for each i∈[1,m] performing the following steps:

illumination, by the incident radiation $L_{in}$ emitted by the light source SL, of the interferometric element EI;

acquisition, by the matrix sensor Det, of an image $I_i$ comprising the first portion $P_1$ deriving from the detection of the incident radiation transmitted by the interferometric element alone, $L_{TBG}$, and the second portion P2 deriving from the detection of the incident radiation transmitted $L_{TP}$, $L_{TO}$ by the interferometric element and any particle O, P attached to the surface (Sm) of the thin layer;

calculation, by the processor UT, of the variation of intensity, as a function of the wavelengths of the incident radiation $\lambda_i$ i∈[1,m], of at least one first pixel of the first portion, called first variation $F_{BG}$ and of at least one second pixel of the second portion, called second variation $F_P$;

determination, by the processor UT, of the trend of the phase shift $\phi_i$ between the first variation and the second variation, as a function of the wavelengths of the incident radiation $\lambda_i$ i∈[1,m];

detection of the attached particle P when the phase shift $\phi_i$ is not constant as a function of the wavelengths of the incident radiation $\lambda_i$ i∈[1,m].

Another subject of the invention is a method for manufacturing the interferometric element EI for the detection device D of FIG. 1. This manufacturing method comprises a phase of design of the interferometric element and a step of physical production of this duly designed interferometric element. The design phase of the manufacturing method comprises the following steps:

selection of the particle P to be detected exhibiting an absorption line at a resonance wavelength $\lambda_{res}$;

selection of a substrate of refractive index $n_1$;

determination of the thickness $e_2$ and of a refractive index $n_2$ of the thin layer satisfying the following conditions:

$$-0.8 \times \frac{\lambda_{res}}{4n_1} < e_2 < 1.2 \times \frac{\lambda_{res}}{4n_1} \text{ and } \sqrt{n_1} < n_2 < 1.5\sqrt{n_1}.$$

According to one embodiment of the manufacturing method of the invention, the resonance wavelength $\lambda_{res}$ lies between 3 μm and 12 μm, and the particle or particles P to be detected are explosive particles, biomolecules or any object exhibiting an infrared signature.

The invention claimed is:

1. A method for detecting at least one predetermined particle (P), said particles having a refractive index $n_3$ and an absorption line at a resonance wavelength $\lambda_{res}$, said absorption line inducing a variation of the refractive index over a spectral region, said method comprising the following steps:

A. emission of a coherent incident radiation ($L_{in}$) at a plurality of distinct wavelengths $\lambda_i$ i∈[1,m], in succession one by one, said wavelengths lying within said spectral region;

for each i∈[1,m], the following steps are performed:

A1: illumination, by the incident radiation ($L_{in}$) at the wavelength $\lambda_i$, of an interferometric element (EI) comprising at least two superposed layers, a so-called thin layer (CM), disposed on top of a so-called substrate layer (Sub), both transparent to the wavelength $\lambda_i$, said particle being attached to a surface (Sm) of said thin layer, a refractive index $n_2$ and a thickness $e_2$ of the thin layer being such that the interferometric element (EI) forms a Fabry-Perot cavity with or without attached particle (P) and generates an inversion of the contrast between Fabry-Pérot-induced fringes without attached particles and Fabry-Pérot-induced fringes with attached particles;

A2: acquisition, by a matrix sensor, of an image $I_i$ comprising a first portion ($P_1$) deriving from the detection of the incident radiation transmitted ($L_{TBG}$) by the interferometric element alone and a second portion ($P_2$) deriving from the detection of the incident radiation transmitted ($L_{TP}$, $L_{TO}$) by the interferometric element and any particle (O, P) attached to a surface (Sm) of said thin layer, pixels of the first portion exhibiting an intensity that is different from those of the pixels of the second portion;

B. calculation of the variation of intensity, as a function of the wavelengths of the incident radiation $\lambda_i$ i∈[1,m], of at least one first pixel of the first portion, called first variation ($F_{BG}$) and of at least one second pixel of the second portion, called second variation ($F_P$);

C. determination of a trend, as a function of the wavelengths of the incident radiation $\lambda_i$ i∈[1,m], of a phase shift $\phi_i$ between the first variation and the second variation;

D. detection of the attached particle when the phase shift $\phi_i$ is not constant as a function of the wavelengths of the incident radiation $\lambda_i$ i∈[1,m].

2. The method according to claim 1, wherein, in the step B, an identification of the first pixel and of the second pixel is performed by image processing by comparing the intensity of the pixels of an image Ii associated with a wavelength $\lambda_i$.

3. The method according to claim 1, wherein in the step C, the determination of the trend of the phase shift $\phi_i$ comprises the determination of a function $fn_p$ representing the wavelengths $\lambda_{max,P}$ of the local maxima of the second variation as a function of the wavelengths) $\lambda_{max,BG}$ of the local maxima of the first variation.

4. The method according to claim 1, wherein said distinct wavelengths $\lambda_i$ i∈[1,m] lie between a lower wavelength $\lambda_{inf}$ for which a real part of the refractive index of the particle is minimum over said spectral region, and an upper wavelength $\lambda_{sup}$, for which a real part of the refractive index of the particle is maximum over the spectral region.

5. The method according to claim 4, wherein, in the step A, the plurality of distinct wavelengths $\lambda_i$ i∈[1,m] is chosen so that the wavelengths are distributed over all of a portion of said spectral region lying between the lower wavelength $\lambda_{inf}$ and the upper wavelength $\lambda_{sup}$.

6. The method according to claim 1, wherein the plurality of distinct wavelengths $\lambda_i$ i∈[1,m] comprises a first plurality of wavelengths and a second plurality of wavelengths, said first plurality of wavelengths lying within a spectral interval such as $$\left[\lambda_{inf}; \frac{\lambda_{res} + \lambda_{inf}}{2}\right]$$

and the second plurality of wavlengths lying within a spectral interval such as $$\left[\frac{\lambda_{res} + \lambda_{sup}}{2}; \lambda_{sup}\right].$$

7. The method according to claim 1, wherein said interferometric element is adapted so that, for a predetermined thickness $e_{30}$ of particles (P) attached and passed through by the incident radiation, the contrast of the second variation is nil or substantially nil over a spectral band included within the spectral region.

8. A device (D) for detecting at least one predetermined particle (P), said particle having a refractive index $n_3$ and an absorption line at a resonance wavelength $\lambda_{res}$, said absorption line inducing a variation of the refractive index over a spectral region $^{\Delta\lambda\lambda}{}_{res}$; said device comprising:
- a coherent light source (SL), wavelength-tunable and adapted to emit a coherence incident radiation ($L_{in}$) at a plurality of distinct wavelengths $\lambda_i$ i∈[1,m], configured to successively emit said wavelengths, said wavelengths lying within said spectral region;
- an interferometric element (EI) arranged so as to be illuminated by the incident radiation ($L_{in}$) and comprising at least one so-called thin layer (CM) disposed on top of a so-called substrate layer (Sub), both transparent in said spectral region, said particle being attached to a surface (Sm) of said thin layer, a refractive index $n_2$ and a thickness $e_2$ of the thin layer being determined from an index $n_1$ of the substrate and from the resonance wavelength $\lambda_{res}$, such that the interferometric element (EI) forms a Fabry-Pérot cavity with or without attached particle P;
- a matrix sensor (Det) adapted to detect an image comprising a first portion ($P_1$) deriving from the detection of the incident radiation transmitted ($L_{TBG}$) by the interferometric element alone and a second portion ($P_2$) deriving from the detection of the incident radiation transmitted ($L_{TP}$) by the interferometric element and any particle (O, P) attached to a surface (Sm) of said thin layer, pixels of the first portion exhibiting an intensity that is different from those of the pixels of the second portion;
- a processor (UT) linked to the sensor and configured:
  - to calculate, as a function of wavelengths of the incident radiation $\lambda_i$ i∈[1,m], the variation of intensity of at least one first pixel of the first portion, called first variation ($F_{BG}$) and of at least one second pixel of the second portion, called second variation ($F_P$),
  - to determine a trend, as a function of the wavelengths of the incident radiation $\lambda_i$ i∈[1,m], of a phase shift $\phi_i$ between the first variation and the second variation;
  - to detect the attached particle when the phase shift $°_i$ is not constant as a function of the wavelengths of the incident radiation $\lambda_i$ i∈[1,m].

9. The device according to claim 8, wherein the thickness $e_2$ of the thin layer lies between $0.8 \times \lambda_{res}/4n_1$ and $1.2 \times \lambda_{res}/4n_1$ with $n_1$ a refractive index of the substrate, and wherein the refractive index $n_2$ of the thin layer is such that $\sqrt{n_1} < n_2 < 1.5\sqrt{n_1}$, preferably such that $1.10\sqrt{n_1} < n_2 < 1.35\sqrt{n_1}$.

10. The device according to claim 9, wherein a material of the thin layer is identical to the material of the substrate and wherein said surface of the thin layer is structured so that the effective index of the thin layer perceived by the incident radiation is such that $\sqrt{n_1} < n_2 < 1.5\sqrt{n_1}$.

11. The device according to claim 8, wherein the thickness $e_2$ of the thin layer is adapted so that, for a predetermined thickness $e_{30}$ of particles attached and passed through by the incident radiation, the contrast of the second variation is nil or substantially nil over a spectral band included in the spectral region.

12. The device according to claim 8, wherein the thin layer is made of ZnS, ZnSe, CdSe, SiN, AlN, Ta2O5, TiO2, ZrO2 and the substrate is made of Si or Ge.

13. A method for manufacturing an interferometric element (EI) for a detection device comprising an interferometric element (EI) comprising at least one so-called thin layer (CM) disposed on top of one so-called substrate layer (Sub), both transparent in a spectral region, said method comprising a phase of design of said interferometric element and a step of material production of said duly designed interferometric element, wherein the design phase comprises the following steps:
A. selection of at least one particle (P) to be detected exhibiting an absorption ray at a resonance wavelength $\lambda_{res}$ lying within said region;
B. selection of a substrate of refractive index $n_1$;
C. determination of a thickness $e_2$ and of a refractive index $n_2$ of the thin layer satisfying the following conditions at the resonance wavelength:

$$0.8 \times \frac{\lambda_{res}}{4n_1} < e_2 < 1.2 \times \frac{\lambda_{res}}{4n_1} \text{ and } \sqrt{n_1} < n_2 < 1.5\sqrt{n_1},$$

and
the interferometric element (EI) forms a Fabry-Perot cavity with or without attached particle P and generates an inversion of the contrast between the Fabry-Pérot-induced fringes without attached particles and the Fabry-Pérot-induced fringes with attached particles wherein the step of material production consists of disposing a thin layer of thickness $e_2$ and of a refractive index $n_2$ on top of a substrate layer of refractive index $n_1$.

14. The manufacturing method according to claim 13, wherein said resonance wavelength $\lambda_{res}$ lies between 3 μm and 12 μm, and wherein the particle or particles to be detected are explosive particles or biomolecules.

* * * * *

UNITED STATES PATENT AND TRADEMARK OFFICE
CERTIFICATE OF CORRECTION

| | |
|---|---|
| PATENT NO. | : 11,592,384 B2 |
| APPLICATION NO. | : 17/247352 |
| DATED | : February 28, 2023 |
| INVENTOR(S) | : Mathieu Dupoy et al. |

It is certified that error appears in the above-identified patent and that said Letters Patent is hereby corrected as shown below:

In the Claims

In Claim 2, Column 14, Line 28, "an image Ii associated" should be -- an image li associated --.

In Claim 8, Column 15, Line 45, "when the phase shift $°_i$ is not constant" should be -- when the phase shift $\phi_i$ is not constant --.

In Claim 13, Column 16, Line 44, "with attached particles" should be -- with attached particles, --.

Signed and Sealed this
Thirtieth Day of May, 2023

Katherine Kelly Vidal
*Director of the United States Patent and Trademark Office*